L. B. McCARGAR.
FEED CUTTING MILL.
APPLICATION FILED MAR. 10, 1919.
1,311,826.
Patented July 29, 1919.
2 SHEETS—SHEET 1.
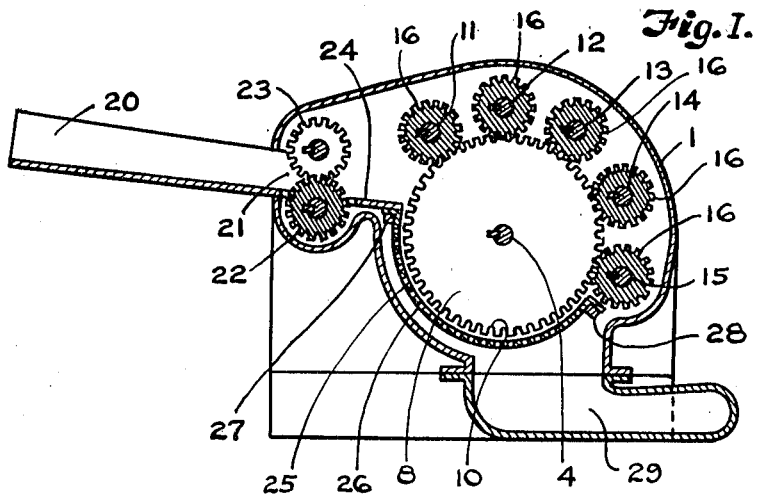
Fig. I.
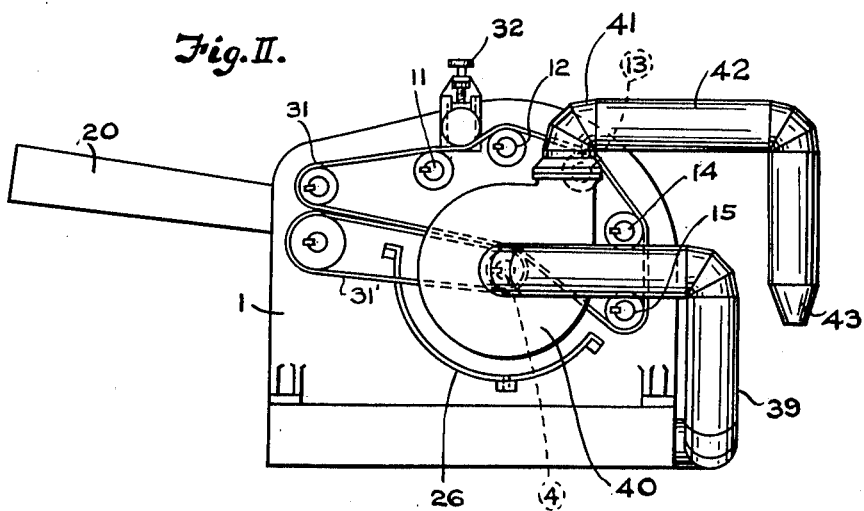
Fig. II.
Inventor
Lorren B. McCargar
Attorney L. B. McCARGAR
FEED CUTTING MILL.
APPLICATION FILED MAR. 10, 1919.
1,311,826.
Patented July 29, 1919.
2 SHEETS—SHEET 2.
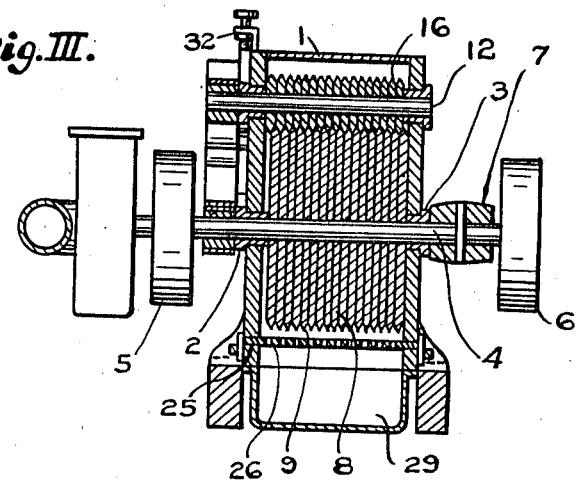
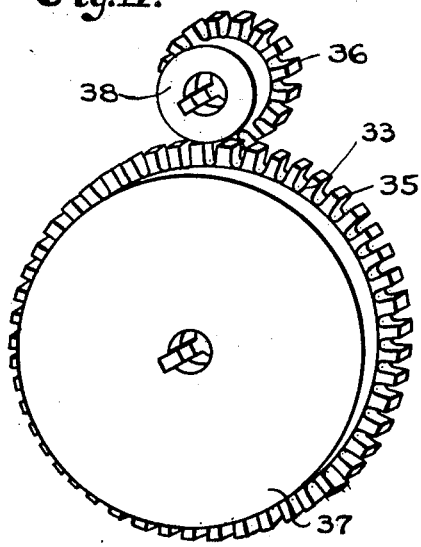
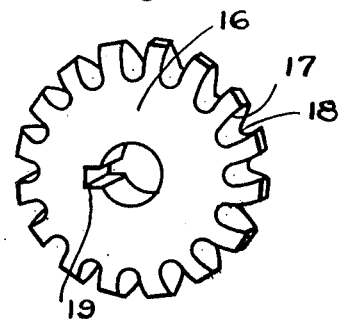
INVENTOR
Lorren B. McCargar
BY
ATTORNEY

UNITED STATES PATENT OFFICE.

LORREN B. McCARGAR, OF KANSAS CITY, MISSOURI, ASSIGNOR TO WALTER P. FULKERSON, OF ST. JOSEPH, MISSOURI.

FEED-CUTTING MILL.

1,311,826.      Specification of Letters Patent.      Patented July 29, 1919.

Application filed March 10, 1919. Serial No. 281,669.

*To all whom it may concern:*

Be it known that I, LORREN B. MCCARGAR, a citizen of the United States, residing at Kansas City, in the county of Jackson and State of Missouri, have invented certain new and useful Improvements in Feed-Cutting Mills; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a feed grinder particularly adapted for reducing alfalfa hay, corn fodder, corn stalks, ear corn either with or without the shucks, velvet beans on the vines or in the pods, threshed Kafir corn in heads or stalks and substantially all other vegetable matter capable of reduction by a machine involving cutters or grinders.

One of the objects of the invention is to produce an efficient, durable and inexpensively constructed machine of the class specified which may be capable of being operated with or without a grid or screen to separate the more finely divided material from the coarser material so that, if desired, the coarser material may be reground by being automatically redelivered to the cutters or grinders.

In the drawings,

Figure I is a vertical longitudinal sectional view through a mill constructed in accordance with my invention.

Fig. II is a side elevational view of the same.

Fig. III is a cross sectional view through the mill.

Fig. IV is a detail perspective view of a slightly modified form of master cutting disk and one complementary disk, and Fig. V is a detail sectional view of one of the rotary cutting disks or knives illustrated in Figs. I and III.

In carrying out the invention I prefer to employ a casing 1 provided with bearings 2 and 3 of approved construction in which is journaled a main shaft 4 provided near its opposite ends with fly wheels 5 and 6 and near one end outside the casing 1 is a pulley 7 around which a belt may pass to apply power from any suitable source. The pulley may be secured to the shaft by wooden break pins as will be explained hereinafter.

In the form shown in Fig. III I have shown a plurality of centrally disposed master disks or cutting knives 8 concentric on said shaft 4 and having beveled edges 9 provided with cut-out portions or notches 10, these disks or knives being arranged side by side and having their beveled edges alternating with a plurality of smaller cutting knives or disks arranged about their peripheries. In Fig. I I have shown a plurality of transverse shafts 11, 12, 13, 14 and 15 in bearings in the casing 1 and each shaft carries a set of relatively small disks, one of which is shown in Fig. V and designated 16. Each disk is a counter-part of the other and each disk is provided with a beveled edge 17 and cut-out portions or notches 18 of considerable depth to co-act with the notches 10 in the disks 8 to permit the material to pass through the machine. The disks or cutters 16 are splined upon the shaft by providing a key-way 19, as will be readily apparent.

By reference to Fig. I it will be seen that the sets of cutters are arranged in arcuate series about the central cutters 8 and that material may be fed into the casing through a chute 20 to pass into the throat 21 of the casing adjacent to which are oppositely rotating cutters 22 and 23 corresponding to the cutters 16 so that as the material passes between the cutters to receive the initial reduction, it will pass onto the table 24 and be carried by the cutters 8 to the arcuately arranged sets of cutters on the shafts 11 to 15, both inclusive.

At the side of the casing is an arcuate slot 25 whereby a removable grid or screen 26 may be introduced to rest upon the support rails 27 and 28 so that when the grid is in place only the more finely divided material may pass through its meshes into the receiving chamber 29 to be carried off by the conveyer, to be referred to hereinafter.

If it is desired to grind the material in a coarse condition, the grid 26 may be removed and the material as it leaves the cutters 8 and the cutters on the shaft 15 will be deposited in chamber 29 to be subsequently removed.

All of the shafts for all the cutters except for the cutters 22 will be driven at the same relative speed through the medium of a belt 31 which passes over pulleys on the respective shafts, said belt being adapted to be tightened by a usual form of belt tightener 32. The shaft for cutters 22 is driven by a separate belt 31' which passes over a pulley of greater diameter than the pulley on shaft for cutters 22.

For the purpose of illustration I have shown the shafts as being belt and pulley driven but obviously chains and sockets may be substituted if desired.

As heretofore explained, the pulley 7 is preferably connected to the shaft 4 by wooden break pins, the purpose of this is to permit the pulley to become loose in the event that iron, rocks or other objectionable material is fed into the machine. The pins will break when sufficient resistance is set up in the machine and the pulley will become loose before the cutters are damaged.

Instead of the cutters 8 and 16 I may substitute a master cutter such as indicated at 33 in Fig. IV with substantially rectangular lateral projections 35 instead of the beveled edges 17, these being designed to alternate with smaller cutter members 36 of substantially the same construction, the sets of cutters being placed upon the shafts in substantially the same way as the cutters, described in the preferred form, except that they will be spaced by washers 37 for the master cutters and 38 for the complementary cutters. Indeed, if desired, thin washers may be introduced between the cutters 8 or the cutters 16. This, however, will not be necessary in all instances.

In actual practice, I prefer to have the cutters 22 and 23 somewhat thicker than those of similar size disposed about the periphery of the master cutters 8.

Leading from the receiving chamber 29 is a suction pipe 39 which communicates with a fan casing 40 in which is a fan mounted on the shaft 4 in the usual manner and said fan casing is provided with an eccentrically disposed outlet 41 communicating with a discharge pipe 42 whereby a pneumatic conveyer is provided. Therefore, it will be seen that the more finely divided material will be removed from the chamber 29 and discharged through the nozzle 43 on pipe 42 to any convenient point. All the material which does not pass through the screen to the chamber 29 will be carried by the teeth of the master cutter above the table 24 and re-delivered between the cutters 16 and the cutters 33 of the master cutter unit so that the uncut material may pass between the cutting disks a number of times before it is finally reduced sufficiently to pass through the screen 26.

Having thus described my invention, what I claim as new therein, and desire to secure by Letters-Patent is:

1. A mill comprising a centrally located rotary cutter unit, complementary cutters rotatably mounted about the first named cutter, said rotary cutter unit and complementary cutters having spaced serrated peripheral cutting portions intergearing the rotary cutter unit with the complementary cutters, and means for operating the cutters.

2. A mill comprising a casing, a centrally located rotary cutter unit in the casing, complementary cutters of less diameter than the centrally located cutter and mounted about the periphery thereof, the edges of the smaller cutters alternating with edges of cutters on the centrally located unit, and intergearing the latter with the complementary cutters, and means for feeding material to the casing.

3. A mill comprising a centrally located rotary cutter unit, complementary cutters smaller than the first mounted about the periphery of the centrally located rotary cutter in grouped arcuate series, each group comprising cutters arranged end to end and having their edges alternating with the edges of cutters on the centrally located cutter unit, a material classifying screen beneath the cutters, and a casing for the mill having an inlet opening and a discharge.

4. A mill comprising a housing provided with an inlet and an outlet, a cutter unit journaled in the casing, comprising a plurality of cutting disks arranged end to end and each having a beveled edge with notches in the periphery thereof, said notches forming spaced peripheral portions adapted to intergear the cutter unit with complementary cutters.

5. A mill comprising a rotary cutter unit, complementary cutters of less diameter than the said cutter unit located about the periphery of the same and co-acting with the said cutter unit, a casing receiving the said cutters and having a feed table and an outlet, and a material classifying screen covering the outlet and extending to the feed table and arranged to hold the partially cut material in contact with the rotary cutter unit whereby the partially cut material is carried to the feed table and re-fed to the cutters.

6. A mill comprising a casing having an outlet and a feed table, a rotary cutter unit mounted within the casing, complementary cutters of less diameter than the rotary cutter unit located about the periphery of the same, the rotary cutter unit and the complementary cutters having spaced peripheral cutting portions intergearing the rotary cutter unit with the complementary cutters, and a curved material classifying screen extending from the outlet to the feed table and adapted to hold partially cut material in contact with the rotary cutter unit whereby the latter is adapted to carry the partially cut material back to the table and re-feed such material to the cutters.

In testimony whereof I affix my signature.

LORREN B. McCARGAR.